United States Patent
Wilkens et al.

(10) Patent No.: US 7,810,831 B2
(45) Date of Patent: Oct. 12, 2010

(54) VEHICLE HITCH WITH MULTI-DIRECTIONAL DAMPING

(76) Inventors: Jeff Wilkens, 720 Augusta Pl., West Fargo, ND (US) 58078; Andrew Donald Browen, 225 18th St. East, West Fargo, ND (US) 58078

( * ) Notice: Subject to any disclaimer, the term of this patent is extended or adjusted under 35 U.S.C. 154(b) by 118 days.

(21) Appl. No.: 12/258,998

(22) Filed: Oct. 27, 2008

(65) Prior Publication Data
US 2009/0134601 A1 May 28, 2009

Related U.S. Application Data (60) Provisional application No. 60/982,574, filed on Oct. 25, 2007.

(51) Int. Cl.
*B62D 53/08* (2006.01)
(52) U.S. Cl. ............ 280/423.1; 280/433; 280/441; 280/441.1; 280/438.1; 280/441.2
(58) Field of Classification Search ........... 280/423.1, 280/433, 441.1, 441.2, 441, 438.1, 439, 417.1
See application file for complete search history.

(56) References Cited

U.S. PATENT DOCUMENTS

| | | | |
|---|---|---|---|
| 2,150,269 A | 3/1939 | Dreisbach |
| 2,733,931 A | 2/1956 | Reid et al. |
| 2,968,496 A | 1/1961 | Gouirand |
| 3,137,515 A | 6/1964 | Masser |
| 3,203,723 A | 8/1965 | Montenare |
| 3,208,770 A | 9/1965 | Freitas et al. |
| 3,227,470 A | 1/1966 | Funk |
| 3,269,751 A | 8/1966 | Whattoff |
| 3,380,758 A | 4/1968 | Granning |
| 3,400,949 A | 9/1968 | Kendall |
| 3,426,377 A | 2/1969 | Beckwith et al. |
| 3,708,183 A | 1/1973 | Jones |
| 3,865,406 A | 2/1975 | Dutton |
| 4,057,265 A | 11/1977 | Grace |
| 4,137,587 A | 2/1979 | Rosengren |
| 4,148,498 A | 4/1979 | Taylor, Jr. |
| 4,153,270 A | 5/1979 | Brockmiller |
| 4,215,876 A | 8/1980 | Jacks |
| 4,373,847 A | 2/1983 | Hipp et al. |
| 4,564,209 A | 1/1986 | Kingsley et al. |
| 4,580,806 A | 4/1986 | Kolstad et al. |
| 4,632,371 A | 12/1986 | Wirges et al. |
| 5,209,316 A | 5/1993 | Bauer |
| 5,226,675 A | 7/1993 | Noah et al. |

(Continued)

*Primary Examiner*—Lesley Morris
*Assistant Examiner*—Marlon A Arce
(74) *Attorney, Agent, or Firm*—Marsh, Fischmann & Breyfogle LLP (57) ABSTRACT

The present invention is directed to a trailer hitch isolation assembly that attaches to the tongue of a fifth wheel trailer and that provides a moveable connection between a tow vehicle and the trailer. The hitch assembly includes a floating hitch attachment member such as a king pin, which is adapted to be attached to a tow vehicle. The hitch isolation assembly allows the hitch attachment member to move at least vertically relative to the tow vehicle to which the hitch assembly is connected. One or more air springs connect the floating hitch attachment to the frame of the trailer. These air springs permit relative movement between the attachment support member and the frame.

21 Claims, 11 Drawing Sheets

U.S. PATENT DOCUMENTS

| | | |
|---|---|---|
| 5,413,366 A | 5/1995 | Gibbons |
| 5,427,471 A | 6/1995 | Godbersen |
| 5,503,423 A | 4/1996 | Roberts et al. |
| 5,639,106 A | 6/1997 | Vitale et al. |
| 5,695,204 A | 12/1997 | Ford |
| 5,704,086 A | 1/1998 | Hansen et al. |
| 5,785,341 A * | 7/1998 | Fenton .................. 280/441 |
| 5,823,560 A | 10/1998 | Van Vleet |
| 5,836,603 A | 11/1998 | Logan et al. |
| 6,116,631 A | 9/2000 | Logan et al. |
| 6,170,849 B1 * | 1/2001 | McCall .................... 280/433 |
| 6,170,852 B1 | 1/2001 | Kimbrough |
| 6,746,037 B1 | 6/2004 | Kaplenski et al. |
| 6,854,757 B2 | 2/2005 | Rehme |
| 6,986,524 B2 | 1/2006 | Heitzmann |
| 7,338,063 B2 | 3/2008 | Graber |
| 7,380,810 B1 | 6/2008 | Wilkens et al. |
| 7,530,591 B2 * | 5/2009 | Mater et al. .............. 280/507 |
| 7,703,793 B2 * | 4/2010 | Kovach .................. 280/483 |
| 2008/0296867 A1 * | 12/2008 | Bouwkamp et al. ........ 280/439 |

* cited by examiner

VEHICLE HITCH WITH MULTI-DIRECTIONAL DAMPING

CROSS REFERENCE TO RELATED APPLICATION

This application claims the benefit of the filing date of U.S. Provisional Application No. 60/982,574, entitled "Vehicle Hitch With Multi-Directional Damping," having a filing date of Oct. 25, 2007, the entire contents of which are incorporated herein by reference.

FIELD OF THE INVENTION

The present invention relates to trailer hitches for attaching trailers to motor vehicles such as pick-up trucks and tractor-trailers. More particularly, the present invention relates to a trailer hitch with a slidably connected support and frame, wherein a multi-directional dampening system is operably connected between the support and frame.

BACKGROUND

Trailers can be connected to tow vehicles by any of a variety of hitches, ranging from simple ball hitches and receiver hitches to heavy-duty gooseneck and fifth wheel hitches. The selection of hitch for any particular application depends on a number of factors, including the type of vehicle, the dimensions and weight of the trailer, and the anticipated load (including the weight, dimensions, and type of load). Hitches are available for virtually any motor vehicle on the market today: ball type hitches and receiver hitches are more commonly used with passenger vehicles and light trucks (automobiles, pick-up trucks, and sport-utility vehicles) for light-duty hauling. Gooseneck and fifth wheel type hitches are typically used with heavy-duty pickup trucks and tractor-trailers for hauling heavier loads.

While in motion, all vehicles and all trailers tend to bounce or sway to some degree; the extent of such bouncing or swaying motion depends on the vehicle's speed and road conditions. When a trailer is attached to a tow vehicle by a standard lock-down or solid connection hitch, the trailer cannot move independently of the vehicle. As a result, any bouncing, swaying, and vibration of the trailer are transferred directly to the vehicle through the hitch, leading at best to an uncomfortable ride for the driver and passengers. Movement of the trailer relative to the vehicle may result in the application of forces to the vehicle in one or all of the vertical direction, the horizontal direction and/or about a longitudinal axis (e.g., a torque/moment) defined by the direction of travel of the vehicle and trailer. The safety of the driver and passengers is compromised whenever the forces exerted by the relative movement of the trailer makes it more difficult to control the vehicle, for example, if the driver encounters high bumps, dips, railroad tracks, elevation changes, expansion joints, and situations that require emergency braking (which can cause jack-knifing) or other avoidance maneuvers. As the trailer bobs, bounces, and weaves, the rear end of the vehicle can sometimes be lifted off the road and/or the front end of the vehicle may be pushed from side to side, creating potentially dangerous driving conditions.

Several attempts to alleviate the problems associated with solid connection hitches have been proposed. For instance, a number of fifth wheel hitches have been designed that include a frame having one end pivotally connected to the tow vehicle and a second end supported by one or more air bags. Typically, the fifth wheel or hitch plate is supported by the frame and is disposed between the pivotally connected end and the air bag supported end. Such arrangements allows for limited relative movement (e.g., vertical movement) between a vehicle and a fifth wheel trailer connected to the fifth wheel. However, such arrangements typically permit no side-to-side movement (horizontal movement) or torsional movement between the vehicle and the fifth wheel trailer.

SUMMARY OF THE INVENTION

The present invention is directed to a trailer hitch isolation assembly that attaches to the tongue of a fifth wheel, gooseneck or other trailer and that provides a moveable connection between a tow vehicle and the trailer. The hitch assembly includes a floating hitch attachment member such as a king pin or ball receiver, which is adapted to be attached to a tow vehicle. The hitch isolation assembly allows the trailer to move at vertically relative to the vehicle to which the hitch assembly is connected. At least a first air spring has a first end fixedly connected to a hitch attachment support member and a second end fixedly connected to a frame that is connected to or is part of the trailer. The air spring permits relative movement between the hitch attachment support member and the frame. Generally, the air spring provides a pliable connection that at least partially isolates the trailer and the vehicle from each other. Instead of acting as a single unit, the vehicle and the trailer act at least partially independently of each other: the bouncing, jerking, twisting and swaying motions transferred from one to the other by many conventional hitches are reduced or eliminated, resulting in better control (for the driver) and a safer and more comfortable ride (for the driver, passengers, and load).

In one aspect, a fifth-wheel hitch assembly is provided for attaching a fifth-wheel trailer to a tow vehicle. The assembly includes a sleeve for attachment to a tongue of a fifth-wheel trailer. Such a sleeve has a bore extending between upper and lower ends. A slide member associated with a hitch pin is adapted to be received within the bore of the sleeve. Further, interconnected to the hitch pin and/or slide member is a support surface that is generally transverse to the direction of movement of the slide relative to the bore of the sleeve. This support surface provides a surface for attaching one or more pneumatically adjustable air springs to the hitch pin and slide member. Likewise, these pneumatically adjustable air springs may be interconnected to the frame of the trailer and/or the slide member to provide a compliant support between the slide member/hitch pin and the sleeve. When disposed through the sleeve member, an upper end portion of the slide member further includes a retainer. Such a retainer generally has a dimension (e.g., diameter) that is larger than a corresponding dimension of the sleeve. Accordingly, the retainer prevents the slide member from being withdrawn from the sleeve and/or limits movement of the slide member in at least one direction.

In one arrangement, the hitch pin and the slide member are separate elements. In another arrangement, the hitch pin and the slide member are an integrally formed member. In such an arrangement, one end of the integral member may define a pin and a second end may define a slide. The sleeve member receives the slide member such that these members may move relative to one another in at least a first direction and transfer forces therebetween in at least a second direction. Generally, the sleeve member is sized to permit the slide member to move between first and second positions relative to the sleeve member. The sleeve member may be integrally formed within the frame member and/or fixedly attached to the frame member. In any case, the sleeve member may be positioned such that it receives the slide member and permits the slide member to move between the first and second positions.

In one arrangement, the frame and the attachment support member define spaced opposing surfaces. In such an arrangement one or more air springs may be disposed between these surfaces. By compressing the air springs, the surfaces may move closer together. Likewise by stretching the air springs, the distance between the opposing surfaces may expand. In other arrangements, such air springs may be interconnected to, for example, side surfaces of the frame and/or attachment support member. That is, the air springs need not be disposed between opposing surfaces.

The air spring is typically a variable-pressure or adjustable-pressure air spring. For purposes of this specification, the term "spring" refers to an elastic device that regains its original shape and/or position after being compressed or extended. The terms "air spring" and "pneumatic spring" refer to a type of spring in which the energy storage element is air (or other gas) confined in a container that includes an elastomeric bellows or diaphragm. To provide enhanced support and or dampening, the hitch may incorporate two or more air springs. In such an arrangement, the internal pressure of the multiple springs may be different, the same and/or the springs may be in pneumatic communication.

The air springs help dampen transmission of movement from the trailer to the vehicle (or vice versa) and may allow adjustment of the trailer hitch for different loads. In one arrangement, the air spring is an adjustable-pressure, single or double bellows type air (i.e., pneumatic) spring. The air spring can be a manually inflatable or automatically inflatable; these types of air springs can readily be inflated with a portable compressor, with an air hose (at service stations or other facilities), or with an on-board compressor and control system accessible to the driver of the tow vehicle. Changing the pressure in the air spring helps adjust the trailer hitch for different types and weights of load. To limit the expansion and/or compression of the air springs, movement limiting stops may be attached to the hitch attachment member the frame and/or the attachment support member.

In one arrangement, the air spring forms the only direct mechanical connection between the attachment support member and the frame. However, the sliding interface between the sleeve and the slide member associated with the hitch attachment member transmit forces lateral forces. The slide member and/or the sleeve member may incorporate any materials or components that facilitate relative movement between these members. A non-inclusive list includes a slide blocks, wheels and bearings. In one particular arrangement, outside surfaces of the slide member are covered with low friction slide blocks. The slide block(s) and/or the wheels may be made of any suitable low friction material (such as ACETAL, NYLATRON, NYLON, TEFLON, or other suitable material); alternatively, the components may be made of a metal core with a low-friction coating.

DETAILED DESCRIPTION

The present invention is directed to a simple and sturdy trailer hitch that allows relative movement between a tow vehicle and an attached trailer in at least one direction. The invention is applicable to a variety of trailer hitch assemblies, however, in the following description, the invention is set forth in the context of a fifth wheel trailer hitch. It will be appreciated, however, that certain aspects of the invention are not limited to such applications. Further, in the following detailed description of the invention, reference numerals are used to identify structural elements, portions of elements, surfaces or areas in the drawings, as such elements, portions, surfaces or areas may be further described or explained by the entire written specification. For consistency, whenever the same numeral is used in different drawings, it indicates the same element, portion, surface or area as when first used.

Figure 1:
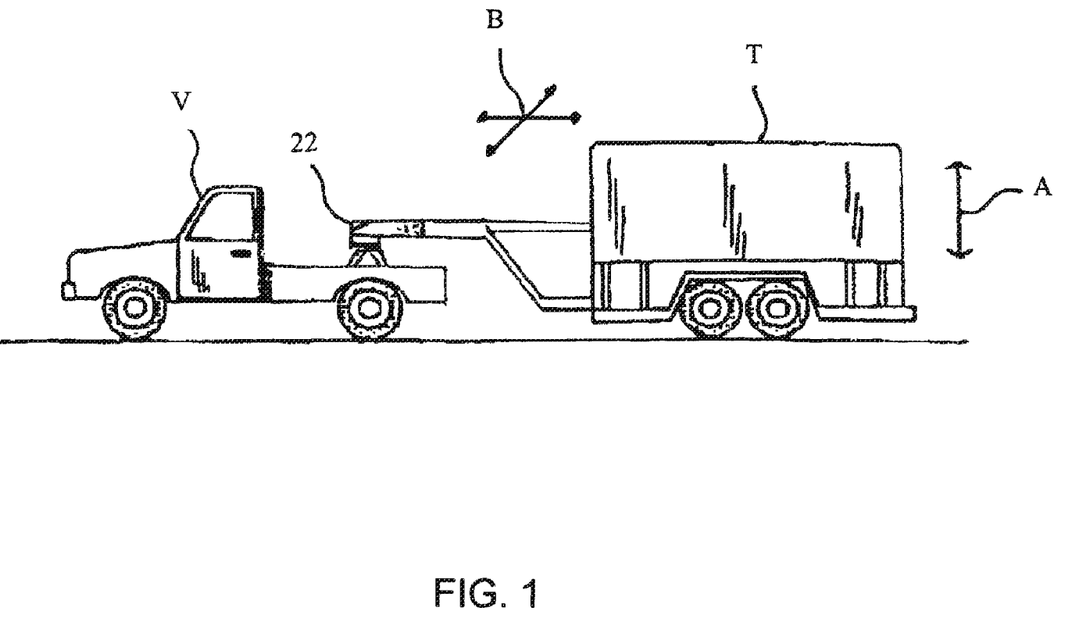
FIG. 1 illustrates connection of a trailer to a tow vehicle.
Figure 2:
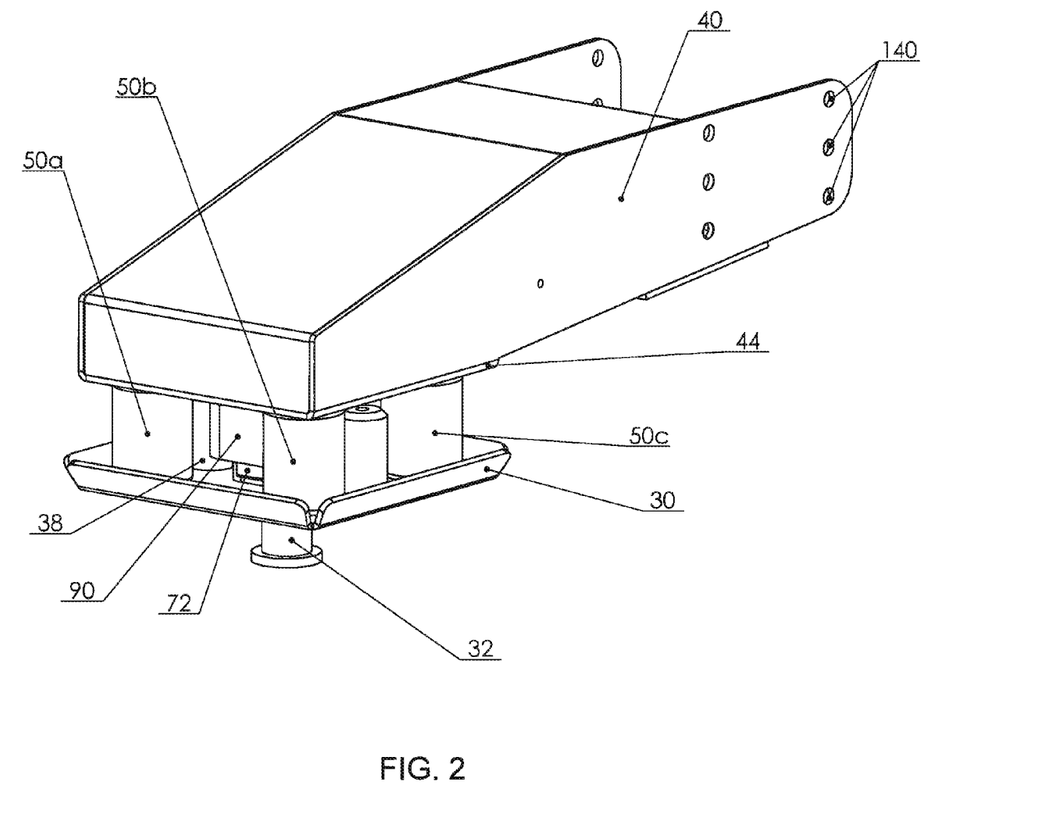
FIG. 2 provides a perspective view of a fifth-wheel hitch incorporating an isolation assembly.
Figure 3:
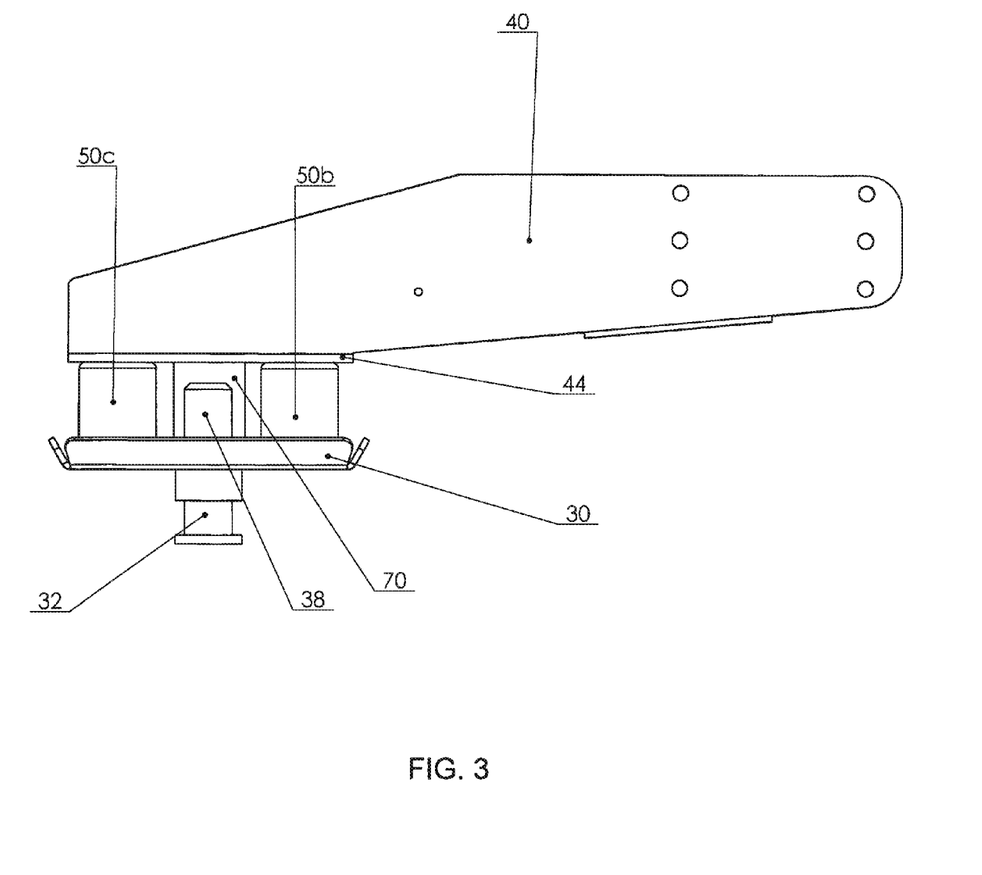
FIG. 3 illustrates a side view of the hitch assembly of FIG. 1.

FIG. 1 illustrates a tow vehicle v that is interconnected to a trailer t using a fifth wheel hitch assembly. As shown, the fifth wheel hitch assembly of the trailer includes a dampening/isolation assembly 20 that permits relative movement between the tow vehicle in at least the vertical direction. Further, the isolation assembly 20 is adapted to attenuate the relative movement between the vehicle v and the trailer t. As used herein, the terms "horizontal," "vertical," "left," "right," "up," "down," as well as adjectival and adverbial derivatives thereof, refer to the relative orientation of the illustrated structure as the particular drawing figure faces the reader.

FIGS. 2-9 illustrate various views of a first embodiment of a fifth-wheel hitch isolation assembly 20, which may be attached to a trailer. Generally, the isolation assembly 20 includes a frame 40 that may be attached to the tongue of a trailer. As illustrated, the frame 40 includes a number of bolt holes 140 that may be utilized to bolt the frame 40 to the trailer. However, it will be appreciated that the frame 40 may also be welded to the tongue of a trailer. The assembly 20 further includes a pin support member 30 that is compliantly connected to the frame. In this particular embodiment, the support member defines a support flange that supports a hitch pin 32 that may be received within a hitch of a fifth wheel hitch plate. In the present embodiment, four air springs 50a-d are utilized to compliantly interconnect the pin support member 30 to a top plate 44 of the frame 40. In this regard, the air springs 50a-d are disposed between the flange of the support member 50 and the top plate 44 of the frame 40. These air springs 50a-d permit the hitch pin 32 to move (e.g., float) relative to the frame as is discussed herein.

Figure 4A:
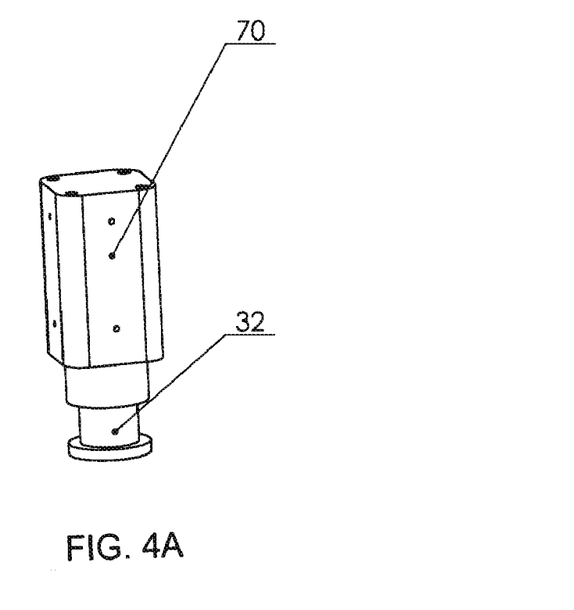
FIGS. 4A and 4B illustrate a sliding connection member utilized with the hitch assembly of FIG. 2.
Figure 4B:
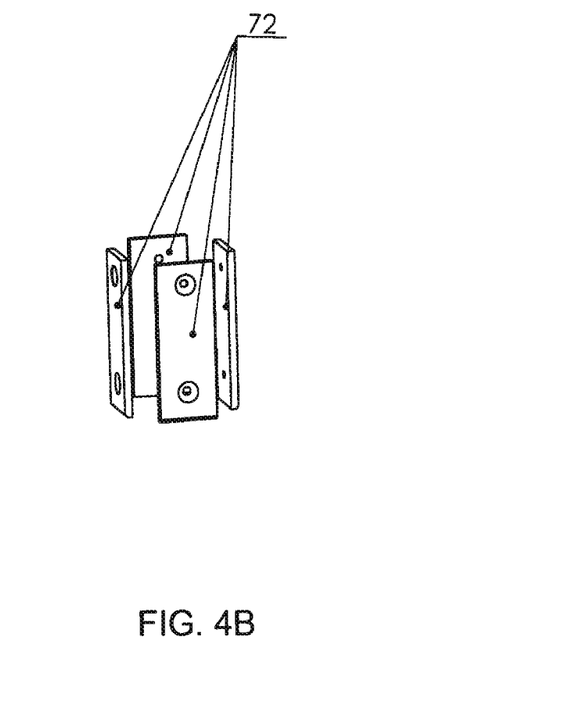

FIG. 4a illustrates the pin 32. As illustrated, the pin 32 in this particular embodiment is integrally formed with a slide member 70. As will be discussed herein, the slide member is disposable through a sleeve member 90 connected to frame to provide structure for transmitting towing forces (e.g., lateral forces) between the trailer and a tow vehicle while maintaining a moveable connection therebetween. In the present embodiment, the bottom end of the integral member defines the pin 32 while a top end defines the slide member 70. In the present embodiment, the slide member 70 is defined as a substantially square metal block. However, this is not a requirement. To reduce the friction experienced by the outside surface of the slide member 70, a number of low friction slide blocks 72 may be connected to the outside surfaces of the slide member 70. See FIGS. 4b and 5.

Figure 5:
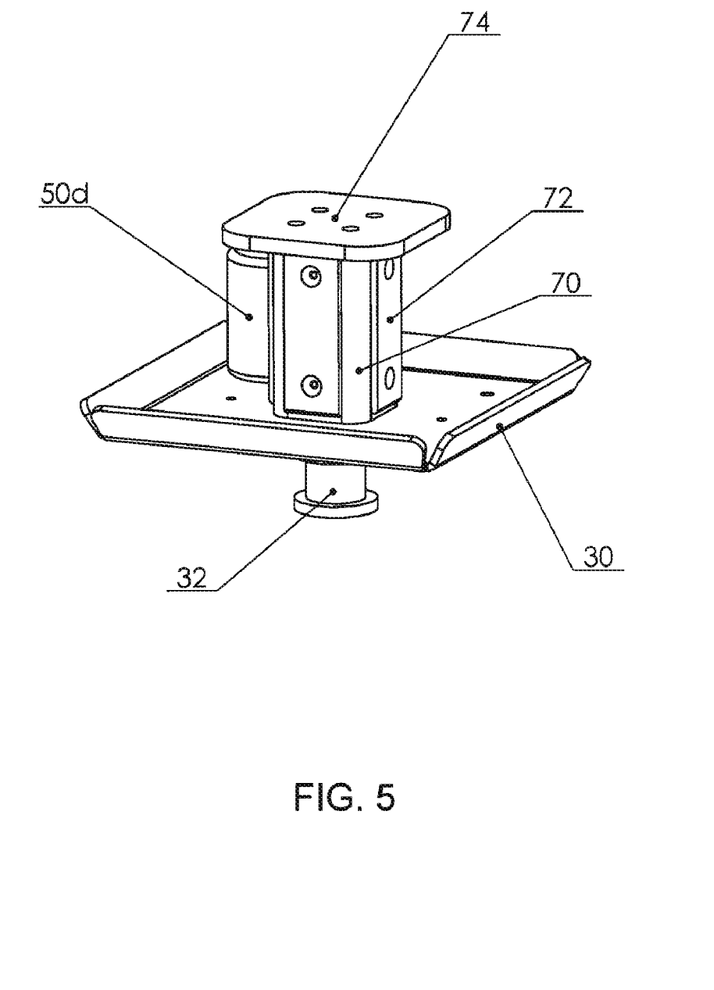
FIG. 5 illustrates a support member interconnected to the slide member of FIG. 4A.

As shown by FIG. 5, the pin support member 30 in the present embodiment is interconnected between the slide member 70 and pin 32. As will be appreciated, this pin support member 30 may be interconnected in any appropriate manner including bolting and/or welding. More particularly, in the present embodiment the support member includes an aperture through which the pin 32 may pass. The slide member 70 having a greater diameter than the pin abuts against the aperture within the pin support member 30. Accordingly, bolts may pass through the pin support member 30 into the slide member 70 for secured interconnection therewith.

Figure 6:
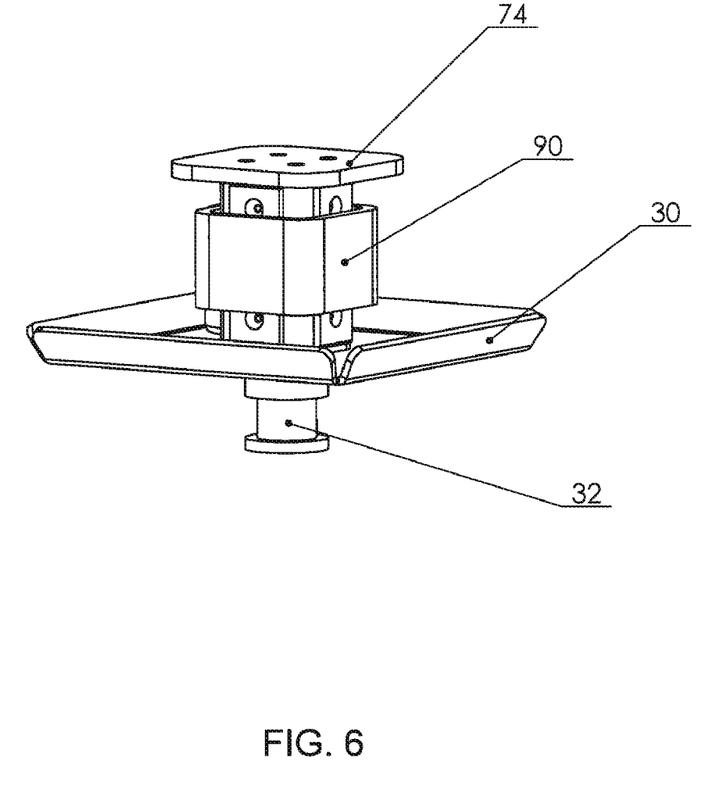
FIG. 6 illustrates a sleeve member disposed around a portion of the slide member.
Figure 7:
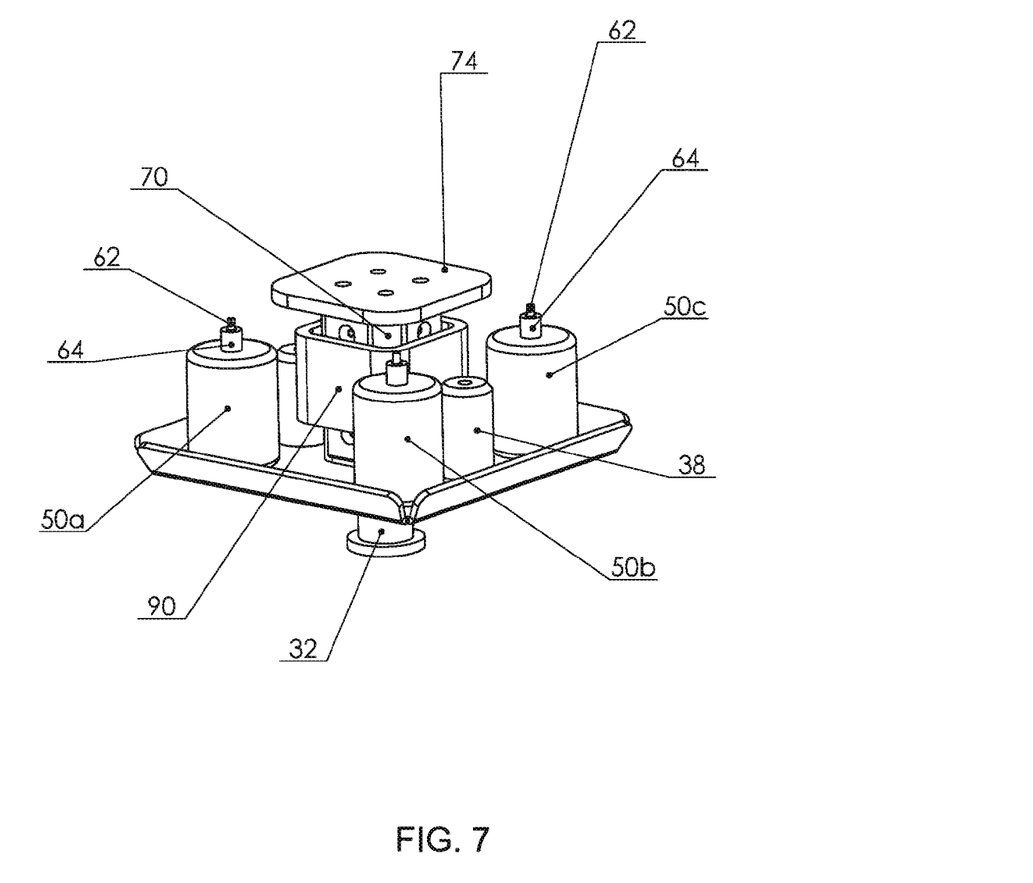
FIG. 7 illustrates air bags utilized to interconnect the support member to a frame member.
Figure 8:
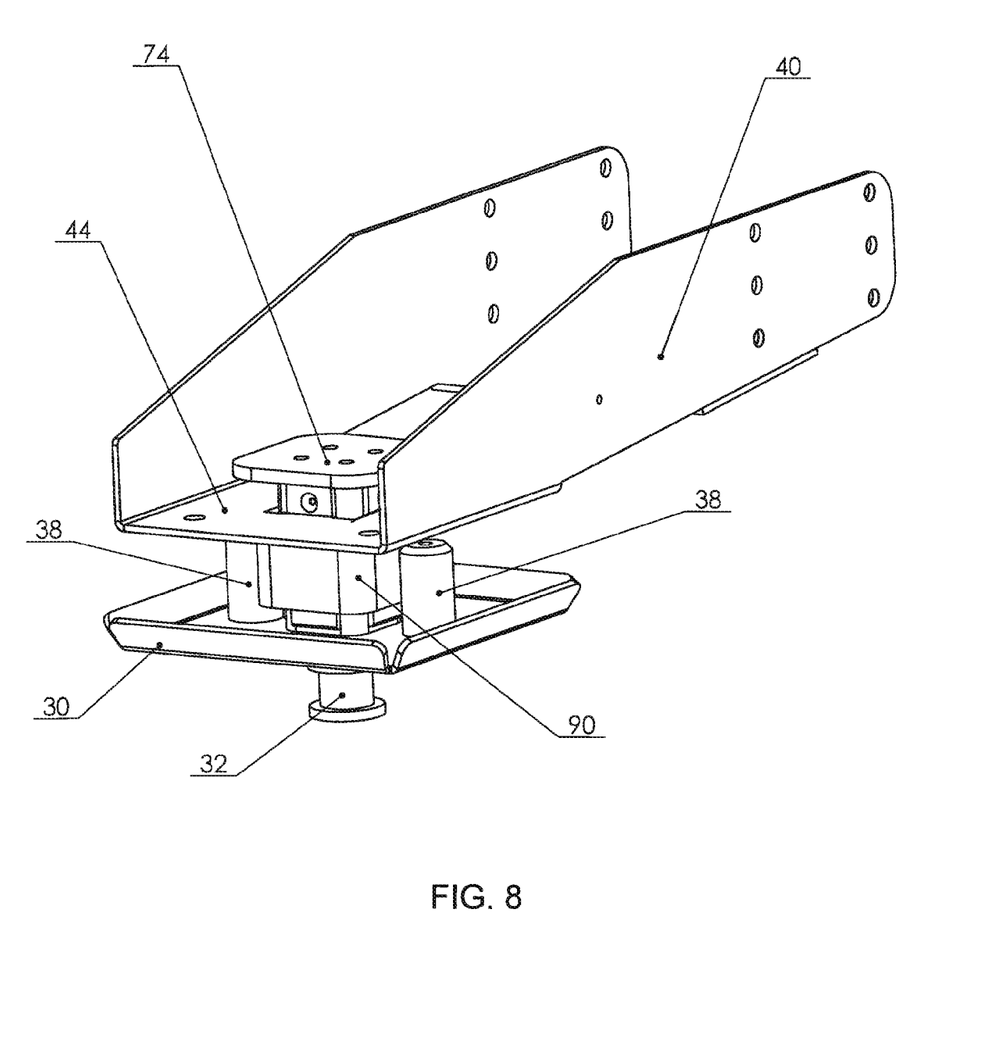
FIG. 8 illustrates first and second stop members utilized to limit the motion of the hitch assembly of FIG. 1.
Figure 9:
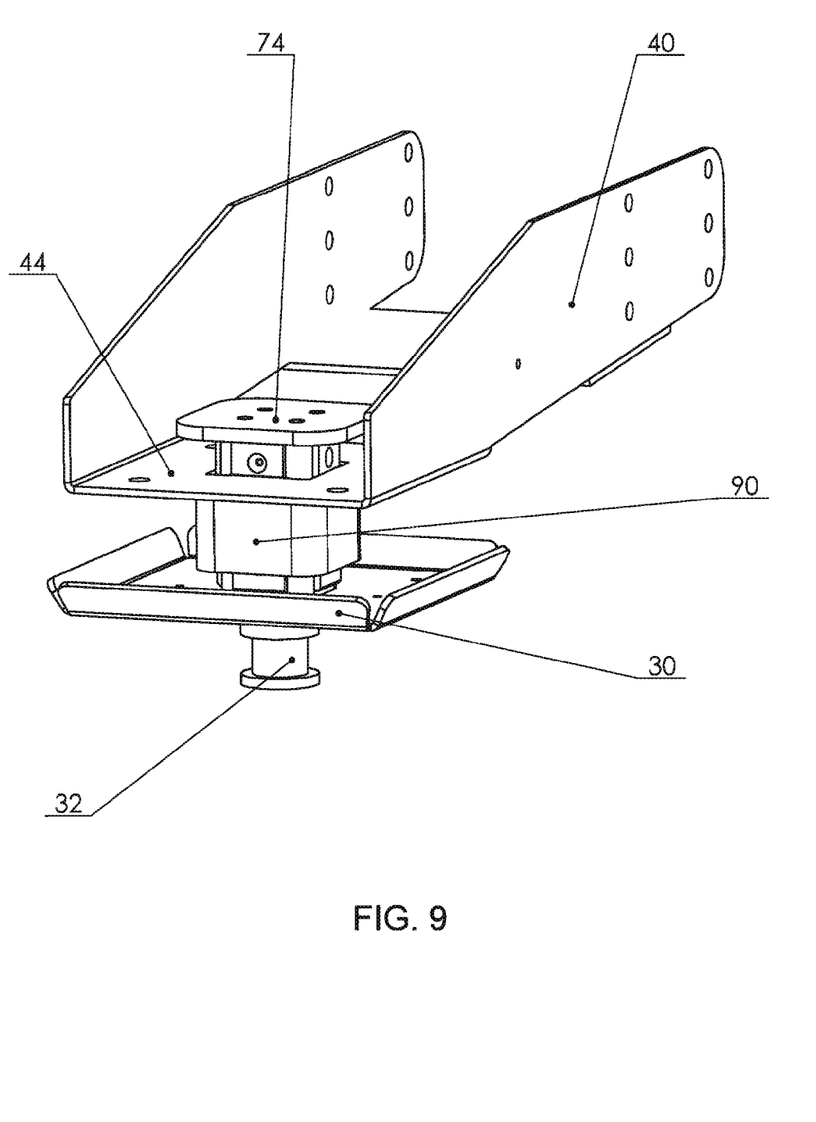
FIG. 9 illustrates disposition of the slide member through the sleeve member.

As shown in FIG. 6, the slide member 70 and the attached slide blocks 72 are disposed through a sleeve member 90. Referring briefly to FIGS. 8 and 9, it will be noted that the sleeve member 90 is fixedly interconnected to the top plate 44, which is integral with or fixedly interconnected to the frame 40. In this regard, it will be noted that the pin 32 and slide member 70, as illustrated in FIG. 6, are operative to move up and down relative to the sleeve member 90 (e.g., slide through the sleeve). To limit the movement of the slide member/pin, a top restraining plate 74 is interconnected to the upper end of the slide member 70. This restraining plate 74 is sized larger than an aperture within the top plate 44 and is larger than the outside diameter/circumference of the sleeve member 90. In this regard, the restraining plate prevents excessive movement of the pin 32 downward relative to the frame 40. See FIG. 8. Likewise, to limit the upward movement of the pin 32 relative to the frame 40, the isolation assembly 20 may include one or more stop members 38.

These stop members are operative to limit the movement of the pin 32, slide member 70 and support member 30 in the upward direction towards the frame during compression of the air bags. As shown, the stops 38 are attached to the support member 30; however, such steps may be connected to the top plate as well. The restraining plate 74 attached to the upper end of the slide member 70 limits the stretching of the airbags stretch. Together, these members 38, 74 define a limited range of movement of the isolation assembly 20 and prevent potential damage to the airbags 50a-d that may result from over extension and/or over compression. It will be noted that most air springs are essentially an air bladder and do not have significant internal structure. Therefore, it is desirable to limit the compression or expansion of the springs to prevent potential damage.

The air springs are pneumatic devices that can be manually inflated or automatically inflated. That is, the internal pressure of the air springs may be selectively adjusted. To permit selective inflation of the air springs 50a-d, each spring may include an air valve 62. See FIG. 7. In addition, the air springs may have various air lines and valves that may be interconnected by a common manifold (not shown). This manifold may be interconnected to a source of compressed air such that the air springs may be inflated to a common pressure. In any case, the air springs can readily be inflated with a portable air compressor or with an onboard air compressor and interconnected to a control system accessible by the driver of the tow vehicle.

Each air spring includes an upper mounting lug 64 and a lower mounting lug (not shown). The upper mounting lugs 64 are dimensioned to fit through holes within the top plate 44, which is fixedly connected to the frame 40. See FIG. 7. In this regard, the mounting lugs are inserted into the holes and secured thereto by suitable sized nuts. The lower lugs are secured to the pin support flange 30. The interconnection of the frame 40 to the support member 30 using the four air springs provides a pliable connection between these members 30, 40. In this regard, the flange 30 and connected pin can be considered a floating pin that is not rigidly connected to the frame 40 at least in the vertical direction.

The air springs 50a-d together with the slide 70 and sleeve 90 form a system that at least partially isolates the vehicle v from the trailer t, thereby reducing transmission of movement therebetween. Instead of acting as a single unit, vehicle v and trailer t act substantially independent of each other. Transmission of movement between the vehicle and the trailer is dampened by the action of the air springs and the generally smooth movement of the slide member with the sleeve. In this regard, trailer t tends to move up and down on its own instead of transmitting such movement to the tow vehicle. Accordingly, bouncing, jerking, swaying, twisting and vibration transfer from the trailer to the vehicle is substantially reduced or eliminated.

Figure 10A:
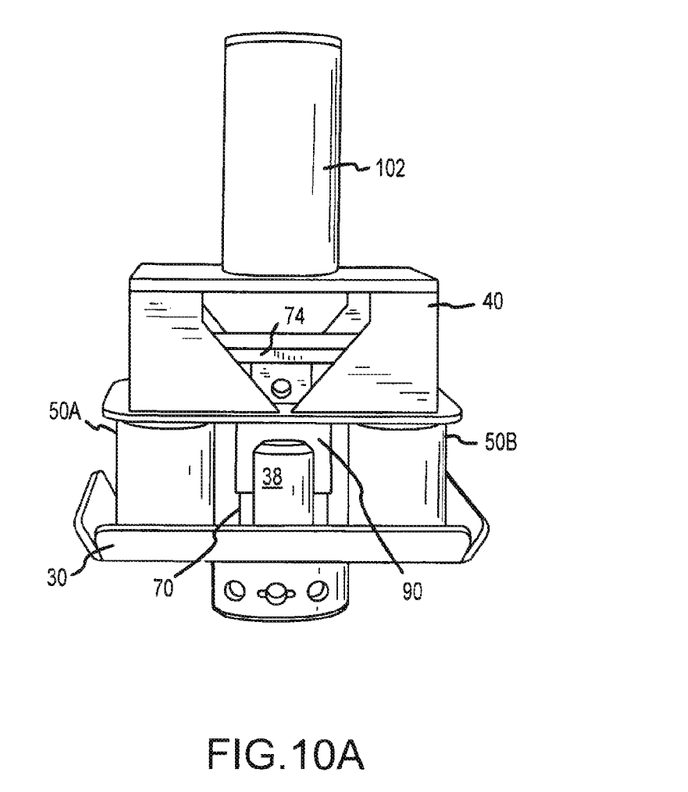
FIGS. 10A and 10B illustrate a perspective and cutaway perspective view, respectively, of a second embodiment of a hitch assembly.
Figure 10B:
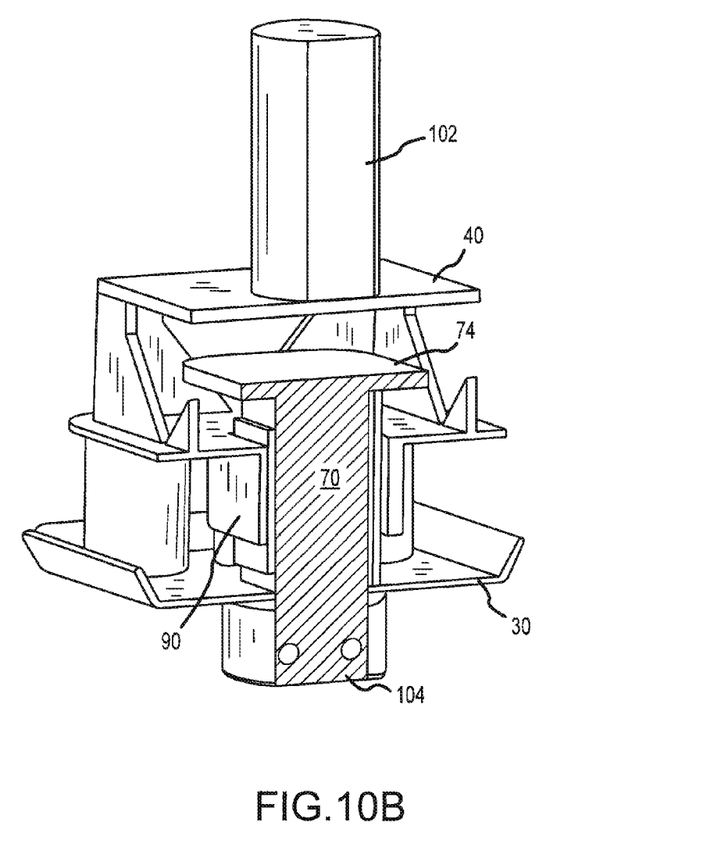

Though discussed above as utilizing a slide and sleeve assembly to transmit towing forces between a tow vehicle and a fifth-wheel trailer, it will be appreciated that further embodiments of the isolation assembly may have other applications. For instance, such a system may be readily applied to a gooseneck trailer, as illustrated in FIGS. 10A and 10B.

In this second embodiment, like elements contain like reference numbers with elements of the first embodiment illustrated in FIGS. 2-9. As shown, in the second embodiment the frame 40 is interconnected to an upper tubular member 102. This upper tubular member 102 may be received within a corresponding vertical tube within a tongue of a trailer. As shown, the frame again supports a sleeve member 90 in which slide member 70 is operative to move between first and second positions. In the second embodiment, the slide member 70 includes a receiver port 104 on its lower end instead of incorporating the hitch pin as discussed above. In this regard, the receiver 104 may be fit over a pin or ball that is interconnected to a tow vehicle. Again, the frame 40 includes an upper plate 44 that provides a surface for coupling the upper end of a plurality of air springs 50a-d. Likewise, interconnected to a lower portion of the slide member receiver 70, 104 is an attachment support member 30, which is compliantly connected to the frame by the air springs. Again, such air springs may be pneumatically adjustable to provide a desired compliance between the support member, which defines a flange, and the top plate 44 of the frame 40.

To limit movement of the flange relative to the support plate 44, one or more stops 38 may be disposed on the support member 30, or alternatively, on the upper plate 44. Likewise, to limit the downward movement of the slide member 70, restraining plate 74 is disposed on the upper end of the slide member 70. Again, this restraining plate 74 is larger than the diameter and/or width of the aperture divined by the sleeve member 90.

It will be understood by those of ordinary skill in the art that the materials, dimensions, weight, and selection of components for above-described trailer hitch isolation assemblies depend on the particular application and anticipated load-bearing capacity of the hitches. All hitch components are preferably made of sturdy, durable materials, including but not limited to stainless steel, steel, aluminum, iron, nylon and polymers. Metal components may be machined of standard stock and welded or otherwise fastened together; alternatively, some or all of these components may be cast, poured or injected by suitable techniques known in the art of metalworking. By way of example, the sleeve and/or slide members may be made of heavy-duty stainless steel. Slide blocks and, if utilized, any wear strips interconnected to the interior surfaces of the sleeve in their various embodiments are preferably made of low-friction plastics such as NYLATRON, NYOIL, ACETAL, TEFLON and the like (however, laminate and composite materials may also be utilized).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such or other embodiments and with various modifications required by the particular application (s) or use(s) of the present invention. It is intended that the appended claims be construed to include alternative embodiments to the extent permitted by the prior art.

The invention claimed is:

1. A fifth-wheel hitch assembly for attaching a fifth-wheel trailer to a tow vehicle, comprising:
   a frame for fixed attachment to a fifth wheel trailer;
   a sleeve supported by the frame, said sleeve having an upper open, a lower end and an internal bore;
   a hitch pin including:
      an lower attachment portion for disposition within a receiver of a tow vehicle;
      an upper slide portion disposed through said bore of said sleeve and being sized for slidable movement relative to said sleeve;
      a retainer connected to an upper end of said hitch pin extending through said upper end of said sleeve, said retainer having a dimension greater than a corresponding dimension of the bore of the sleeve; and
      a flange extending outwardly from a body of the hitch pin at a location between said lower attachment portion and said upper slide portion; and
   at least one pneumatically adjustable air spring having a first end connected to said flange and a second end connected to said frame.

2. The apparatus of claim 1, wherein said frame further comprises:
   a support surface, wherein said support surface is spaced from and substantially parallel to said flange.

3. The apparatus of claim 2, wherein said at least one pneumatically adjustable air spring is disposed between said flange and said planar surface.

4. The apparatus of claim 2, further comprising:
   at least one stop interconnected to one of said flange and said support surface, said stop having a height dimension that is less than a distance between said flange and said support surface.

5. The apparatus of claim 4, wherein said hitch pin is operative to move between a first position where said stop is compressed between said flange and said support surface and a second position where said retainer contacts said upper end of said sleeve.

6. The apparatus of claim 1, wherein said hitch pin further comprises:
   at least one slide block interconnected to an outside surface of said slide portion.

7. The apparatus of claim 1, further comprising:
   at least one slide block disposed within said bore.

8. The apparatus of claim 1, wherein said bore of said sleeve and said slide portion of said hitch pin are correspondingly shaped.

9. The apparatus of claim 8, wherein said bore of said sleeve is non-circular.

10. The apparatus of claim 1, wherein said pneumatically adjustable air spring comprises an elastic bellows.

11. The apparatus of claim 1, wherein at least two pneumatically adjustable air springs connect said flange to said frame, wherein said air springs support said hitch pin relative to said frame free of other direct mechanical connection between said hitch pin and said frame.

12. A fifth-wheel hitch assembly for attaching a fifth-wheel trailer to a tow vehicle, comprising:
    a sleeve for attachment to a tongue of a fifth-wheel trailer, said sleeve having a bore extending between upper and lower ends, said internal bore defining a vertical reference axis;
    a first support surface disposed substantially transverse to said vertical reference axis and being proximate to said upper end of said sleeve;
    a slide member extending through said bore of said sleeve and being size for slidable movement relative to said sleeve along said reference axis;
    a retainer interconnected to an upper end of said slide extending out of said upper end of said sleeve, said retainer having at least one dimension that is greater than a corresponding dimension of said bore of said sleeve;
    a second support surface disposed substantially transverse to said vertical reference axis, said second support surface being fixedly connected to said slide member;
    a hitch pin fixedly connected to said second support surface; and
    at least one pneumatically adjustable air spring disposed between said first and second support surfaces.

13. The apparatus of claim 12, wherein first and second ends of said at least one pneumatically adjustable air spring are connected to said first and second support surfaces, respectively.

14. The apparatus of claim 12, further comprising:
    at least one stop interconnected to one of said first and second support surfaces, said stop having a dimension that is less than a distance between said first and second support surfaces.

15. The apparatus of claim 4, wherein said second support surface and said hitch pin is operative to move between a first position where said stop is compressed between said first and second support surfaces and a second position where said retainer contacts said upper end of said sleeve.

16. The apparatus of claim 12, wherein said hitch pin and said slide member are integrally formed.

17. The apparatus of claim 1, wherein said bore of said sleeve and said slide member are correspondingly shaped.

18. The apparatus of claim 12, further comprising:
    at least one slide block interconnected to an outside surface of said slide member.

19. The apparatus of claim 12, wherein said pneumatically adjustable air spring comprises an elastic bellows.

20. The apparatus of claim 12, wherein at least two pneumatically adjustable air springs connect said second support surface, said hitch pin and said slide member to said first support surface free of other direct mechanical connection between said first and second support surface.

21. The apparatus of claim 12, wherein said retainer comprises a plate having a width greater than a maximum cross dimension of said bore.

* * * * *